United States Patent [19]

Bannai et al.

[11] Patent Number: 5,066,239
[45] Date of Patent: Nov. 19, 1991

[54] CLOCK SPRING

[75] Inventors: Hiroyuki Bannai, Furukawa; Hironori Kato, Sendai, both of Japan

[73] Assignee: Alps Electric Co., Ltd., Japan

[21] Appl. No.: 634,244

[22] Filed: Dec. 26, 1990

[30] Foreign Application Priority Data

Dec. 26, 1989 [JP] Japan ................. 1-148721[U]

[51] Int. Cl.$^5$ ...................... H01R 35/00; H01R 39/02
[52] U.S. Cl. .................................... 439/164; 439/13
[58] Field of Search ............... 439/4, 13, 15, 164; 74/484 R

[56] References Cited

U.S. PATENT DOCUMENTS 4,721,469 1/1988 Carlson .................................. 439/13
4,978,191 12/1990 Hasegawa et al. ............. 439/164 X

FOREIGN PATENT DOCUMENTS 2747126 4/1979 Fed. Rep. of Germany ........ 439/13

Primary Examiner—Eugene F. Desmond
Attorney, Agent, or Firm—Guy W. Shoup; David W. Heid

[57] ABSTRACT

A clock spring is used in a steering system for automobile cars and comprises a stationary member and a movable member provided rotatably relative to the stationary member, both of which are electrically connected to each other by using cables. The cables are received in the receiving portions formed by the stationary member and the movable member, and a spacer having an opening is rotatably provided between the stationary member and the movable member. The cables are wound in one of the cable receiving portions, the remaining portions of the cables being passed through the opening and wound in the other receiving portion in the reverse direction. Guide members are rotatably supported in the opening so that the cables are respectively wound on the free ends of the guide members to form half loops.

4 Claims, 5 Drawing Sheets

CLOCK SPRING

BACKGROUND OF THE INVENTION

The present invention relates to a clock spring used in automobile steering systems or the like which comprises a stationary member and a movable member which are electrically connected to each other by using cables.

Clock springs are generally used as electrical connectors, for example, in automobile steering systems or the like, and comprise a stationary member and a movable member rotatably mounted relative to the stationary member, these members being electrically connected to each other by using flexible cables.

A known example of such a clock spring comprises a cable receiving portion provided between a stationary member and a movable member, and a flat cable which is formed by laminating a plurality of conductor strips between two band films and which is wound into a coil and gently received in the cable receiving portion, one end of the flat cable being fixed to an outer ring wall formed in either the stationary member or the movable member, the other end being fixed to an inner ring wall formed in the other member.

This clock spring permits the flat cable received in the cable receiving portion to be wound on inner ring wall and rewound on the outer ring wall in correspondence with the rotational direction of the movable member. There is thus substantially no tension acting on the flat cable between a state where the flat cable is completely wound on the inner ring wall and a state where the flat cable is completely rewound on the outer ring wall. It is therefore possible to maintain the electrical connection between the stationary member and the movable member, each of which rotate relative to each other.

In the above-described clock spring, since the flat cable is wound and rewound by employing a difference between the diameters of the outer ring wall and that of the inner ring wall, when the rotational amount of the movable member is constant, the length of the flat cable that can be used can be reduced by increasing the difference between these two diameters. However, the diameter of the inner ring wall is always determined by the diameter of a rotational shaft, for example, a steering shaft of an automobile car in which the clock spring is installed. On the other hand, since the diameter of the outer ring wall can be only slightly increased because there is a demand for reduction in the size of the clock spring, the difference between the diameter of the outer ring wall and that of the inner ring wall can also be only slightly increased. Such a clock spring therefore has a problem in that it generally requires a long flat cable, and, as is already known, the use of a long flat cable causes difficulties as regards the production of the clock spring and thus causes an increase in the total cost thereof.

SUMMARY OF THE INVENTION

The present invention has been achieved in consideration of the above situation, and it is an object of the present invention to provide an inexpensive clock spring suitable for reducing the size thereof.

In order to achieve the object, the present invention provides a clock spring comprising a stationary member, a movable member rotatably mounted relative to the stationary member, and cables received in cable receiving portions defined by the stationary member and the movable member, respective ends of the cables being fixed in the stationary member and let out to the outside thereof, the other ends being fixed in the movable member and let out to the outside thereof, wherein a spacer having an opening is rotatably interposed between the stationary member and the movable member, the cables are wound in one of the cable receiving portions separated from each other by the spacer, the remaining portions of the cables are wound in the other cable receiving portions in the reverse direction through the opening, and guide members each having two arms are rotatably supported in the opening so that the cables respectively are wound on the free ends of the arms of the guide members to form half loops.

When the movable member is rotated in either the normal or the reverse direction relative to the stationary member, the cables having a length which is half the rotational amount of the movable member received in one of the cable receiving portions are respectively folded by the guide members and wound in the other cable receiving portions. In this case, since the two arms of each guide member can be rotated while maintaining a predetermined open angle, the guide member prevents the occurrence of buckling of the cables in the folded portions.

BRIEF DESCRIPTION OF THE DRAWINGS

FIGS. 1 to 7 relate to a first embodiment of the present invention in which:

FIG. 1 is an exploded perspective view of the whole clock spring;

FIG. 2 is a partially broken-out plan view of the clock spring shown in FIG. 1;

FIG. 3 is a longitudinal sectional view of the same;

FIG. 4 is a bottom view of an upper case;

FIG. 5 is an exploded perspective view showing a spacer and guide members; and

FIGS. 6 and 7 are explanatory views of the operation of flexible cables; and

DETAILED DESCRIPTION OF PREFERRED EMBODIMENTS

Embodiments of the present invention will be described below with reference to the drawings.

Figure 1:
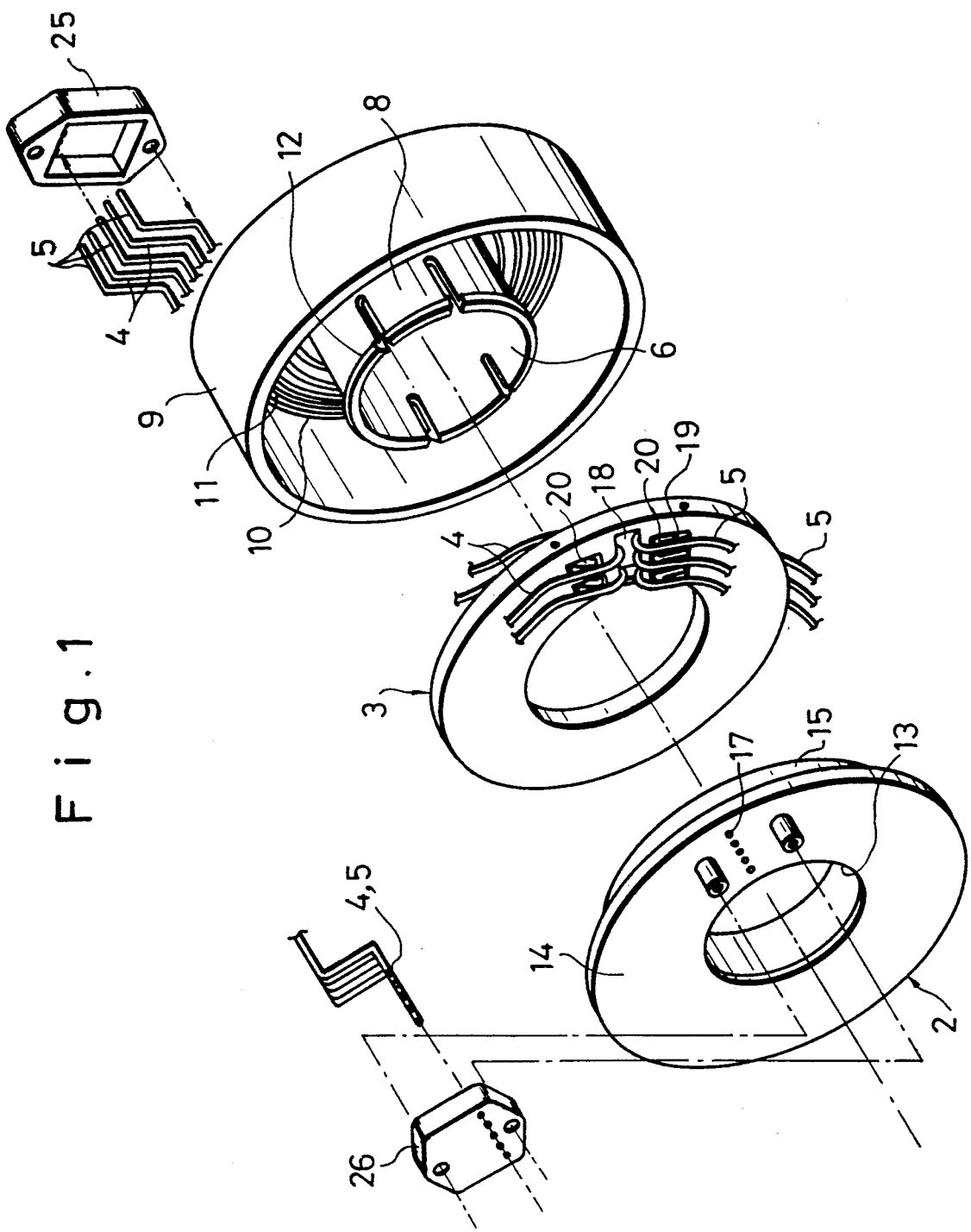
Figure 2:
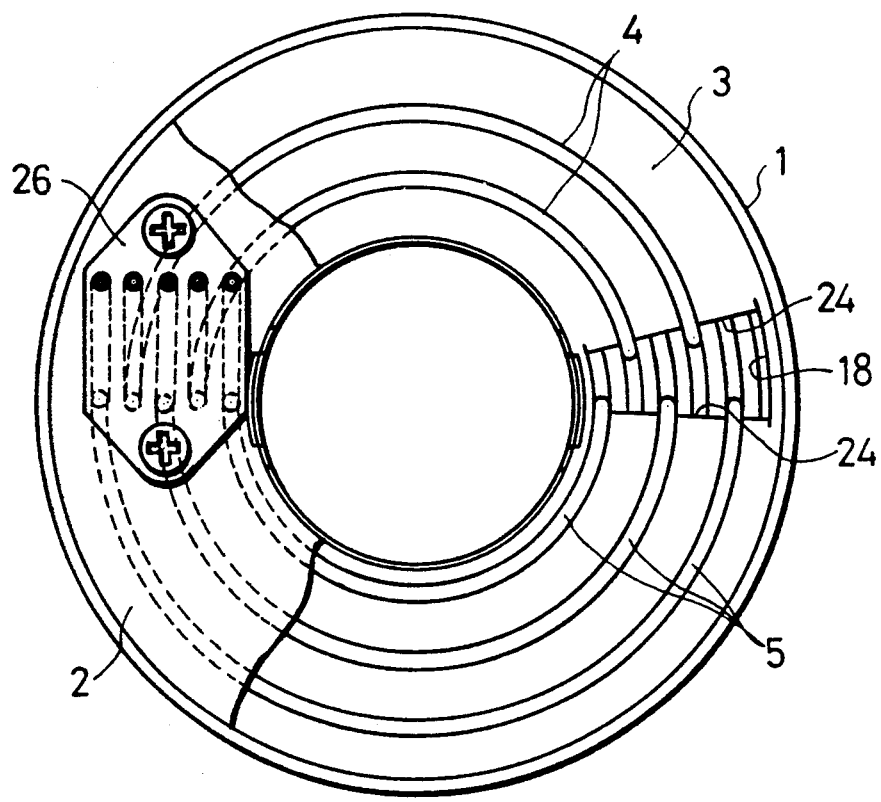
Figure 3:
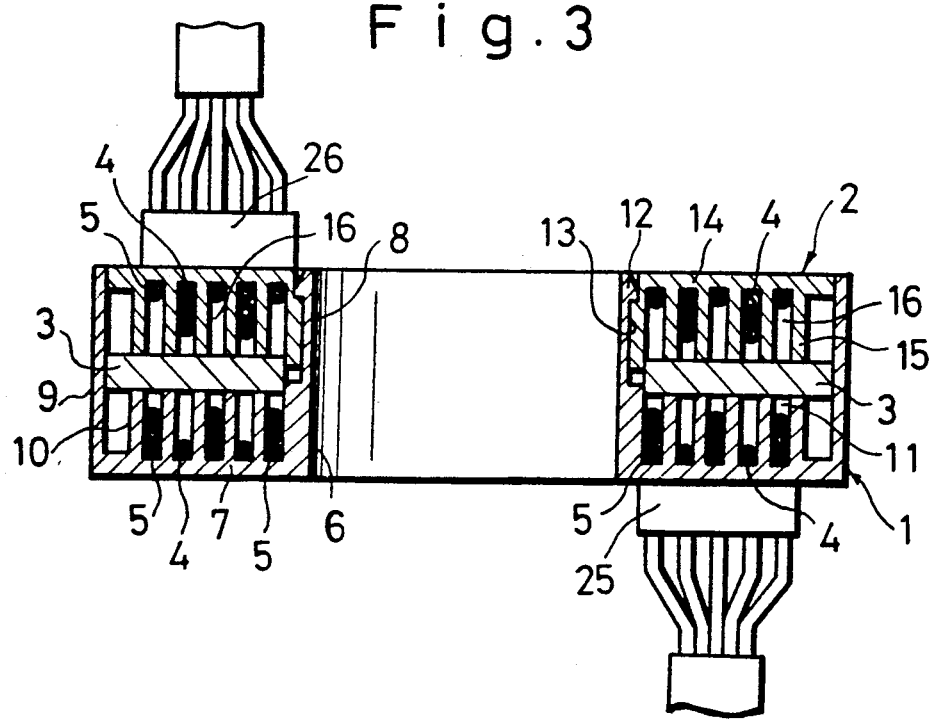
Figure 4:
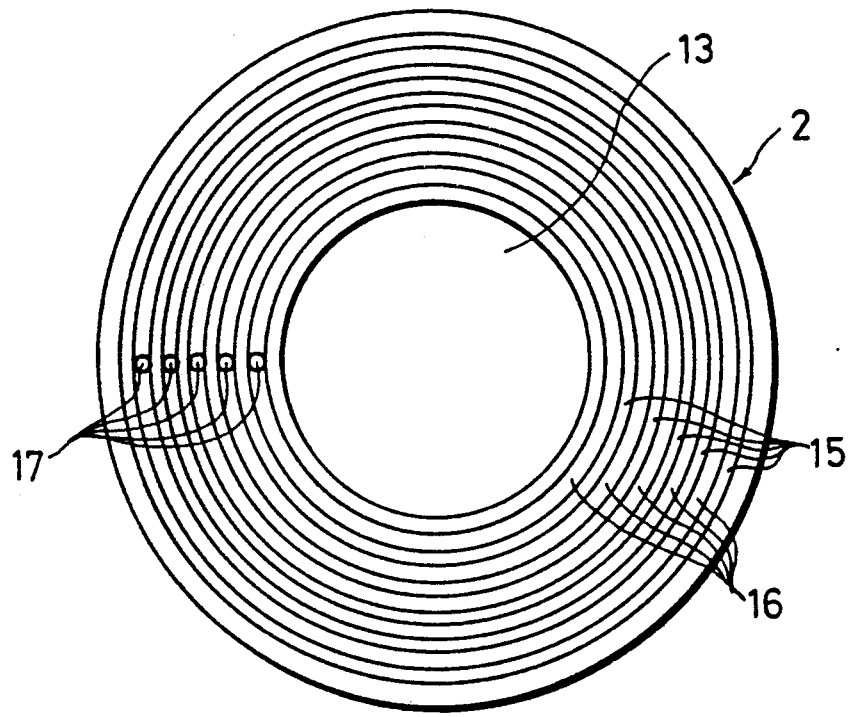
Figure 5:
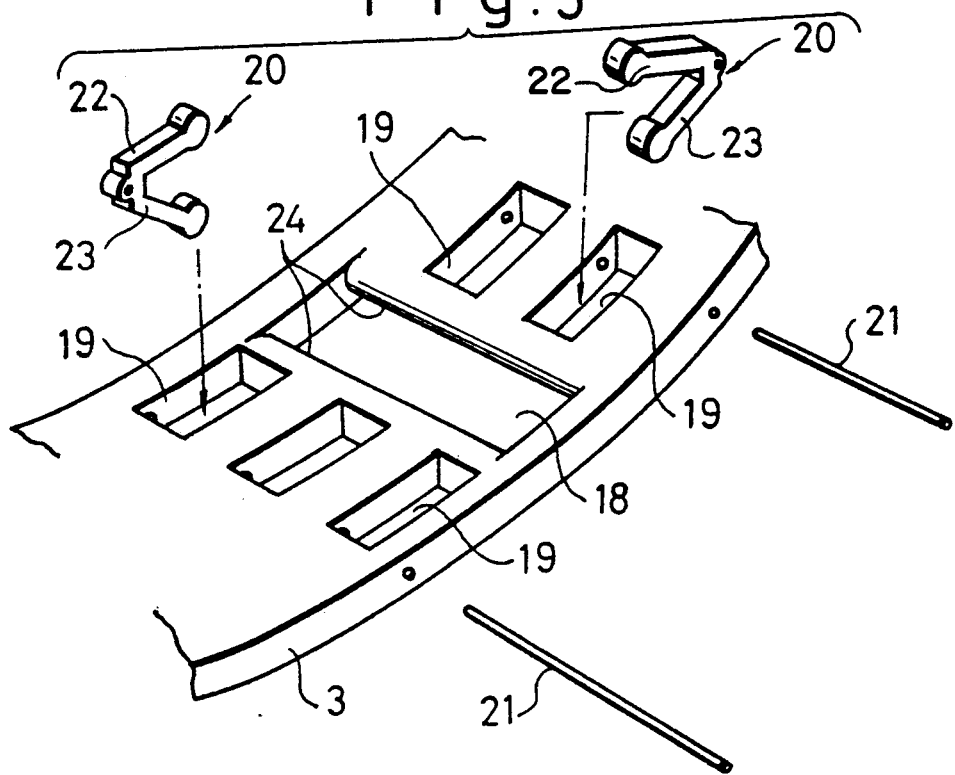
Figure 6:
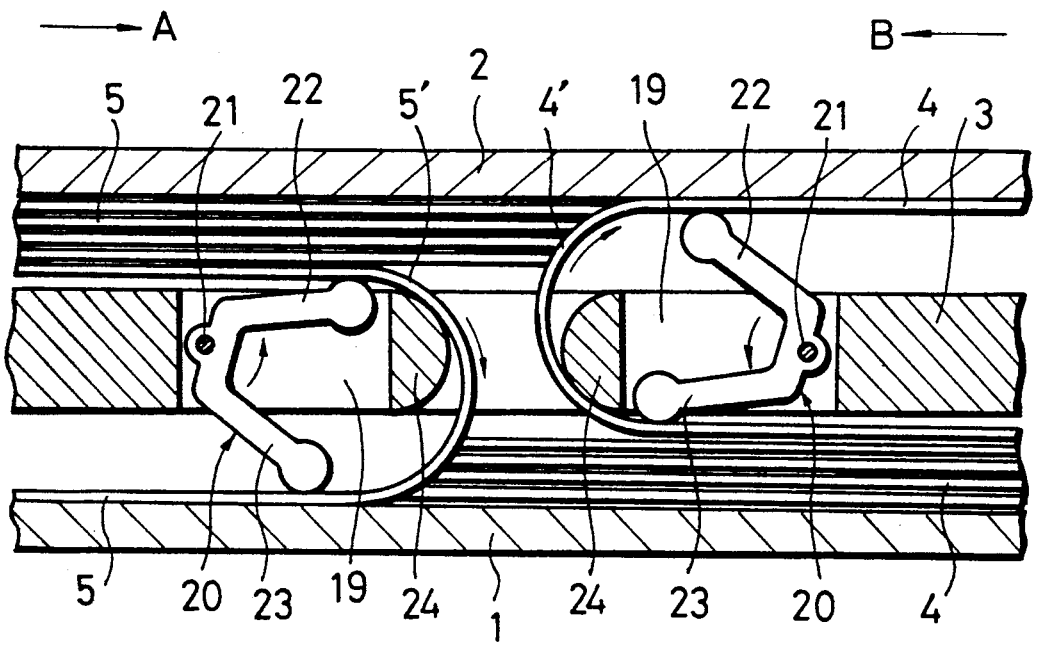
Figure 7:
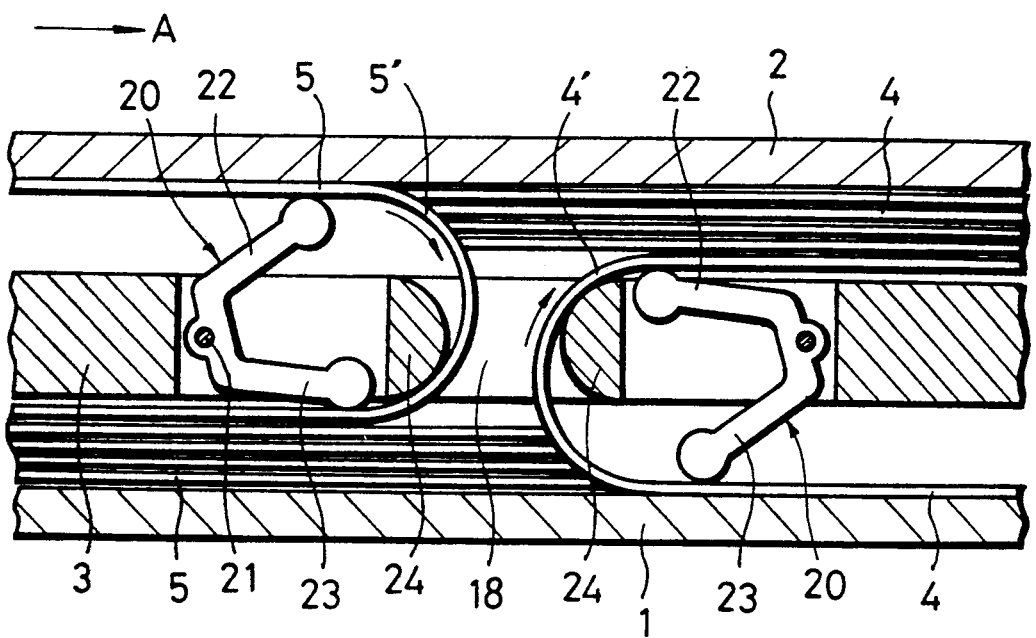

FIGS. 1 to 7 relate to a first embodiment of the present invention. FIG. 1 is an exploded perspective view of a clock spring, FIG. 2 is a plan view of the same, FIG. 3 is a longitudinal sectional view of the same, FIG. 4 is a bottom view of an upper case, FIG. 5 is an exploded perspective view showing a spacer and guide members, and FIGS. 6 and 7 are explanatory views of the operation of flexible cables.

As shown in FIGS. 1 to 3, a clock spring comprises a lower case 1, an upper case 2 rotatably held relative to the lower case 1, a spacer 3 rotatably held between the cases 1, 2, and flexible cables 4, 5 wound between the cases 1, 2.

The lower case 1 has a bottom plate 7 having a center hole 6 formed at the center thereof, and an inner peripheral wall 8 and an outer peripheral wall 9 which are respectively erectly provided in the inner and outer peripheries of the bottom plate 7. The whole of the lower case 1 is formed into a bottomed cylindrical shape. The bottom plate 7 has a plurality of projection strips 10 which are erectly concentrically provided around the central hole formed at the center thereof. The adjacent projection strips 10 form a plurality (5 in this embodiment) of concentrical first cable receiving grooves 11. A cable lead through hole (not shown) is formed in the bottom of each of the cable receiving grooves 11, and a flange 12 is formed at the upper end of the inner peripheral wall 8.

As shown in FIG. 4, the upper case 2 has a top board 14 in which a central hole 13 is formed at the center thereof so that the upper case 2 is rotatably connected to the lower case 1 by snap coupling it to the inside of the flange 12 of the inner peripheral wall 8. The top board 14 has a plurality of projection strips 15 which are vertically concentrically provided around the central hole 13 formed at the center thereof. The adjacent projection strips 15 form a plurality (5 in this embodiment) of concentrical second cable receiving grooves 16. The second cable receiving grooves 16 and the first cable receiving grooves 15 are opposite to each other, with the spacer 3 described below therebetween. A cable lead through hole 17 is also formed at the upper portion of each of the second cable receiving grooves 16.

The spacer 3 is made of a material such as a synthetic resin molded product having excellent lubricating properties. The spacer 3 has a disc-like shape having an opening 18 which is formed in a portion thereof. The spacer 3 is rotatably held between the first cable receiving grooves 11 of the lower case 1 and the second cable receiving grooves 16 of the upper case 2. As shown in FIG. 5, the spacer 3 has a plurality (5 in this embodiment) of elongated holes 19 which are formed corresponding to the first and second cable receiving grooves 11, 16 so as to be arranged alternately through the opening 18. A guide member 20 is inserted into each of the elongated holes 19 (part of the guide members being shown in FIG. 5). The guide members 20 are rotatably supported by the spacer 3 by using a pin 21. Each of the guide members 20 has first and second arms 22 and 23 which extend at a predetermined open angle. The length between the free ends of the first and second arms 22 and 23 is set to a value which is sufficiently greater than the thickness of the spacer 3. A semi-cylindrically curved portion 24 is formed at each of both edges of the opening 18 in the lengthwise direction thereof.

Each of the flexible cables 4, 5 comprises a material called "a wire harness" which is formed by covering a conductor with an insulator. This embodiment uses five wire harnesses. The flexible cables include two first flexible cables 4 and three second flexible cables 5, which are wound in opposite directions. The first flexible cables 4 are respectively wound counterclockwise in the first cable receiving grooves 11 of the lower case 1, ends of the first flexible cables 4 being respectively folded by one of the curved portions 24 of the opening 18 and the arms 22, 23 of the guide members 20 to form half loops, the other ends being respectively wound clockwise along the opposite second cable receiving grooves 16 of the upper case 2. The first flexible cables 5 are respectively wound clockwise in the first cable receiving grooves 11, ends of the cables 5 being respectively folded by the other curved portion 24 of the opening 18 and the arms 22, 23 of the guide members 20 to form half loops, the other ends being counterclockwise along the second cable receiving grooves 16. Ends of the flexible cables 4, 5 are respectively passed through the cable lead through holes (not shown) and let out to the outside of the lower case 1. In the outside of the lower case 1, the ends of the flexible cables are bent into a crank-like shape and fixed in a holder provided on the lower side of the bottom plate 7 of the lower case 1, bundled and connected to a lower connector (not shown). The other ends of the flexible cables 4, 5 are respectively let out to the outside of the upper case 2 through the cable lead through holes 17. In the outside of the upper case 2, the other ends of the cables are bent into a crank-like shape and fixed in a holder 26 provided on the upper side of the upper case 2, bundled and connected to an upper connector (not shown).

A description will now be given of the operation of the clock spring in accordance with this embodiment in a case as an example where the lower case 1 and the upper case 2 are used as a stationary member and a movable member, respectively, mainly with reference to FIGS. 6 and 7. In the drawings, one each of the flexible cables 4, 5 is schematically shown, without showing the lower case 1 and the upper case 2.

FIG. 6 shows the state wherein almost all the first flexible cables 4 are wound in the first cable receiving grooves 11 of the lower case 1, and almost all the second flexible cables 5 are wound in the second cable receiving grooves 16 of the upper case 2. In this case, the folded portions of the first flexible cables 4 are respectively wound along one of the curved portions 24 and the arms 22, 23 of the guide members 20. The guide members 20 are respectively urged by the first flexible cables 4 wound in the first cable receiving grooves 11 so as to upwardly project from the spacer 3. Although the folded portions of the second flexible cables 5 are also respectively wound along the other curved portion 24 and the arms 22, 23 of the guide members, the guide members for the second flexible cables 5 are respectively urged by the flexible cables 5 wound in the second cable receiving grooves 16 so as to downwardly project from the spacer 3.

For example, when the upper case 2 is rotated through a predetermined angle in the counterclockwise direction (direction of arrow A) from the state shown in FIG. 6, the folded portions 4', 5' of the first and second flexible cables 4, 5 are moved in the direction of arrow A for a length which corresponds to half the rotational angle of the upper case 2. As a result, the first flexible cables 4 having a length corresponding to the movement length of the folded portions 4', 5' are let out of the lower case 1 toward the second cable receiving grooves 16 of the upper case 2. At the same time, the second flexible cables 5 in the same length are let out of the upper case 2 toward the first cable receiving grooves 11 of the lower case 1. In this case, since the spacer 3 is rotated for an amount half the rotational amount of the upper case 2 in the direction of arrow A because the folded portions 4' of the first flexible cables 4 contact with the right curved portion 24 shown in the drawing, the opening 18 is rotated following the folded portions 4', 5' of the flexible cables 4, 5. The guide members 20 are also rotated around the pin 19 in the counterclockwise direction according to the winding states of the first and second flexible cables 4, 5. Namely, the right guide members 20 shown in the drawing are rotated by the first flexible cables 4 successively wound in the second cable receiving portions 16, while the left guide members 20 are rotated by the second flexible cables 5 successively wound in the first cable receiving portions 11.

Therefore, when the upper case 2 is rotated N times in the direction of arrow A, as shown in FIG. 7, the folded portions 4', 5' and the spacer 3 are rotated N/2 times in the direction of arrow A. The second flexible cables 5 having a length corresponding to N/2 turns are respectively wound in the first cable receiving grooves 11 from the second cable receiving grooves 16 through the opening 18. At the same time, the first flexible cables 4 having a length corresponding to N/2 turns are respectively wound in the second cable receiving grooves 16 from the first cable receiving grooves 11 through the opening 18. As a result, contrary to the state shown in FIG. 6, the guide members for the first flexible cables 4 are downwardly projected from the spacer 3, while the guide members for the second flexible cables 5 are upwardly projected from the spacer 3.

The upper case 2 can be further rotated in the direction of arrow A until the second flexible cables 5 wound in the second cable receiving grooves 16 of the upper case 2 are completely wound in the first cable receiving grooves 11 of the lower case. That is, the upper case 2 can be rotated a number of times which is twice the number of winding of the flexible cables 5. In this state, the flexible cables 4 wound in the first cable receiving grooves 11 are completely wound in the second cable receiving grooves 16.

Reversely, in the state wherein almost all the first flexible cables 4 are wound in the second cable receiving grooves 16 of the upper case 2, and almost all the second flexible cables 5 are wound in the first cable receiving grooves 11 of the lower case 1, when the upper case 2 is rotated in the counterclockwise direction (the direction of arrow B), since the folded portions 5' of the second flexible cables 5 contact with the left curved portion 24 shown in the drawing so as to rotate the spacer in the direction of arrow B, the folded portions 4', 5' of the first and second flexible cables 4, 5 and the spacer 3 are rotated for an angle half the rotational angle of the upper case 2 in the direction of arrow B. The second flexible cables 5 having a length corresponding to the rotational angle of the spacer 3 is passed through the opening 18 from the first cable receiving grooves 11 of the lower case 1 and wound in the second cable receiving grooves 16 of the upper case 2. At the same time, the first flexible cables 4 having the same length are passed through the opening 18 from the second cable receiving grooves 16 and wound in the first cable receiving grooves 11. In this case, the guide members 20 are respectively pressed by the first and second flexible cables 4, 5 so as to be rotated in the clockwise direction which is reverse to the above direction.

In this way, since the above embodiment may be provided with the first and second flexible cables 4, 5 each having a length which corresponds substantially to half the necessary rotational angle, the length of each of the flexible cables 4, 5 can be extremely reduced, as compared with conventional clock springs. In addition, since a wire harness can be used as each of the flexible cables 4, 5, the total cost of a clock spring can be significantly reduced. The use of short flexible cables 4, 5 causes a reduction in the diameter of a cable receiving portion and is thus useful for reducing the size of a clock spring.

Further, since the concentric first cable receiving grooves 11 and second cable receiving grooves 16 are formed at equal groove pitches in the opposite surfaces of the lower case 1 and upper case 2, with the spacer 3 interposed between the cable receiving grooves 11 and 16, it is possible to prevent not only the flexible cables 5 from entangling with each other but also one of the flexible cables 4 or 5 from entangling between the first cable receiving grooves 1 and the second cable receiving grooves 16. Thus, the flexible cables 4, 5 can be smoothly wound and unwound.

Since the first and second flexible cables 4, 5 are wound in the opposite directions so that the spacer 3 is rotated by the flexible cables 4 or 5 when the upper case 2 is rotated, the driving mechanism of the spacer 3 is significantly simplified.

Since the first and second flexible cables 4, 5 are folded along the arms 22, 23 of the guide members 20 to form half loops, and the guide members are rotatably supported by the spacer 3, it is possible to form the folded portions 4', 5' to have large curvatures in the limited space between the lower case 1 and the upper case 2. From this point, the embodiment is not only useful for reducing the size (thickness) of a clock spring but also ensures the prevention of buckling of the flexible cables 4, 5.

Figure 8:
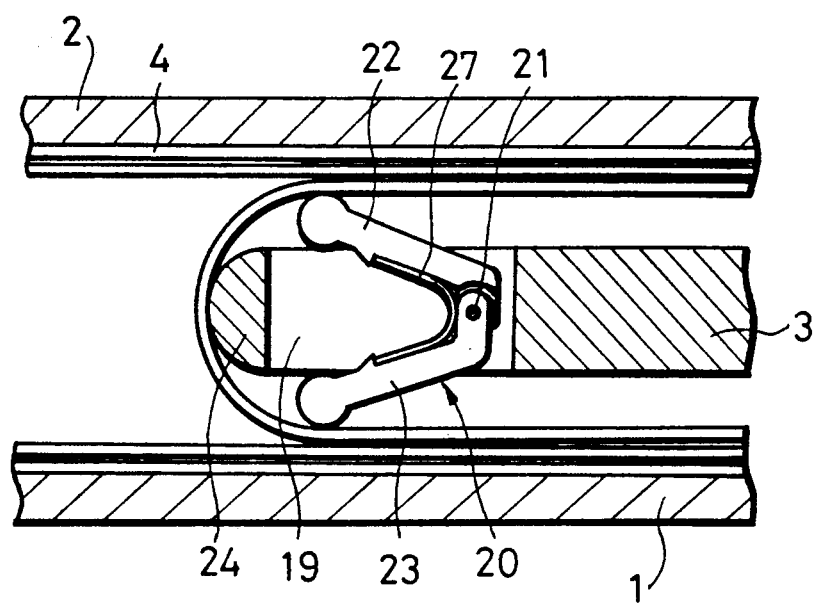
FIG. 8 is a sectional view of a principal portion of another embodiment of a guide member.

Although the above embodiment concerns a case using the guide members 20 each having the first and second arms 22, 23 which are formed integrally with the guide member, a guide member may comprise first and second arms 22, 23 which are separate parts, with a spring 27 interposed therebetween, as shown in FIG. 8. In this case, since the first and second flexible cables 4, 5 are constantly elastically urged toward the top board 14 of the upper case 2 and the bottom plate 7 of the lower case 1 by the arms 22, 23, respectively, only slight deviation in the diameter and lengths of the flexible cables 4, 5 can be absorbed by changing the open angle of the arms 22, 23.

Although the above embodiments concern a case where the first and second cable receiving grooves 11, 16 are formed integrally with the lower case 1 and the upper case 2, respectively, other embodiments may be used. For example, projection strips 10, 15 may be integrally formed on the upper and lower sides of the spacer 3 so that the cable receiving grooves 11, 16 can be provided on the spacer 3. Alternatively, one of the cable receiving grooves 11, 16 may be provided on the spacer 3.

Although the above embodiments concern a case where the lower case 1 and the upper case 2 are used as a stationary member and a movable member, respectively, reversely, the upper case 2 and the lower case 1 may be used as a stationary member and a movable member, respectively.

Although the above embodiments concern a case where a plurality of wire harnesses are used as the first and second flexible cables 4, 5, bare conductive wires without any insulator cover or coated flat conductive wires can be used in place of wire harnesses.

In addition, although the above embodiments concern a case where the spacer 3 is rotated by the first and second flexible cables 4, 5 which are wound in the opposite directions, the mechanism for driving the spacer is not limited to this, and the spacer can be driven by using power transmitting means such as rollers, gears or the like. In this case, the flexible cables 4, 5 are wound in the same direction.

As described above, the present invention enables a significant reduction in the length of each of the cables used, and folded portions of cables with large curvature to be formed in a limited space. The invention therefore can provide an inexpensive clock spring suitable for reducing the size thereof.

What is claimed is:

1. A clock spring comprising:
   a stationary member defining a first cable receiving portion;
   a moveable member rotatably coupled to said stationary member, said moveable member defining a second cable receiving portion;
   a first plurality of cables having one end fixed to said moveable member and another end fixed to said stationary member, said first plurality of cables being wound in a first direction in said first cable receiving portion and wound in a second direction in said second cable receiving portion;
   a second plurality of cables having one end fixed to said moveable member and another end fixed to said stationary member, said second plurality of cables being wound in said first direction in said second cable receiving portion and wound in said second direction in said first cable receiving portion;
   a spacer rotatably disposed between said moveable member and said stationary member, said spacer including an opening; and
   a plurality of guide members pivotably supported on said spacer adjacent said opening, each of said guide members having first and second arms with each arm terminating in a free end, wherein one guide member is provided for each cable of said first and second plurality of cables, and wherein each cable is trained over the free end of the first arm of its associated guide member, looped through said opening, and trained over the free end of the second arm of its associated guide member.

2. A clock spring of claim 1, wherein said first and second arms are rigidly fixed to said guide member at an end opposite said free ends.

3. A clock spring of claim 1, wherein said guide members are formed by first and second arms pivotally connected to each other at an end opposite said free ends, and wherein said guide members include spring means interposed between said first and second arms to urge said arms away from each other.

4. A clock spring according to claim 1, wherein said first cable receiving portion includes a plurality of first projection strips defining first cable receiving grooves, and said second cable receiving portion includes a plurality of second projection strips defining second cable receiving grooves, said first cable receiving grooves and said second cable receiving grooves being opposed such that when a portion of one of said cables is transferred form one of said first or second cable receiving grooves, said portion of said cable is passed through said opening to an opposed second or first cable receiving groove.

* * * * *